(12) United States Patent
Schneider et al.

(10) Patent No.: US 6,547,549 B2
(45) Date of Patent: Apr. 15, 2003

(54) PELLETIZING DIE FOR A PELLETIZER

(75) Inventors: Friedrich Schneider, Weissach (DE); Ulrich Wiesner, Kernen (DE); Jürgen Bartl, Ludwigsburg (DE)

(73) Assignee: Krupp, Werner & Pfeiderer GmbH (DE)

(*) Notice: Subject to any disclaimer, the term of this patent is extended or adjusted under 35 U.S.C. 154(b) by 45 days.

(21) Appl. No.: 09/738,295

(22) Filed: Dec. 15, 2000

(65) Prior Publication Data
US 2001/0005515 A1 Jun. 28, 2001

(30) Foreign Application Priority Data

Dec. 22, 1999 (DE) .......................... 199 62 036

(51) Int. Cl.$^7$ ............................ B29C 47/30; B29C 47/86
(52) U.S. Cl. ....................... 425/67; 425/311; 425/313; 264/142
(58) Field of Search ................... 425/67, 313, 311, 425/382 R, 463, 464, 168; 264/142

(56) References Cited

U.S. PATENT DOCUMENTS

| 3,271,822 A | 9/1966 | Rhino ........................ 425/461 |
|---|---|---|
| 3,323,170 A | 6/1967 | Swickard, Jr. et al. ...... 425/310 |
| 3,461,495 A | 8/1969 | Swickard et al. ........ 425/192 R |
| 3,857,665 A | * 12/1974 | Kennedy ................... 425/464 |
| 4,378,964 A | 4/1983 | Wolfe, Jr. .................. 425/464 |
| 4,752,196 A | 6/1988 | Wolfe, Jr. .................. 425/313 |

FOREIGN PATENT DOCUMENTS

| DE | 1604375 | 2/1972 |
|---|---|---|
| DE | 0432821 A2 | 6/1991 |
| JP | 62-196117 | 8/1987 |

OTHER PUBLICATIONS

German Search Report Aug. 2000.
European Search Report dated Dec. 11, 2002.

* cited by examiner

Primary Examiner—Jan H. Silbaugh
Assistant Examiner—Thu Khanh T. Nguyen
(74) Attorney, Agent, or Firm—Robert F. I. Conte; Barnes & Thornburg

(57) ABSTRACT

A pelletizing die for a pelletizer comprises a base body with holes for melt to pass through; the holes are disposed in rows. Allocated to the holes are wearing-protection inserts, having holes which are in alignment with the holes in the base body. The inserts which are disposed to adjoin each other in a row have a chordal surface where they are turned toward an adjoining insert and are provided with at least one surface of an arcuate segment of a cylinder laterally of the chordal surface.

11 Claims, 3 Drawing Sheets

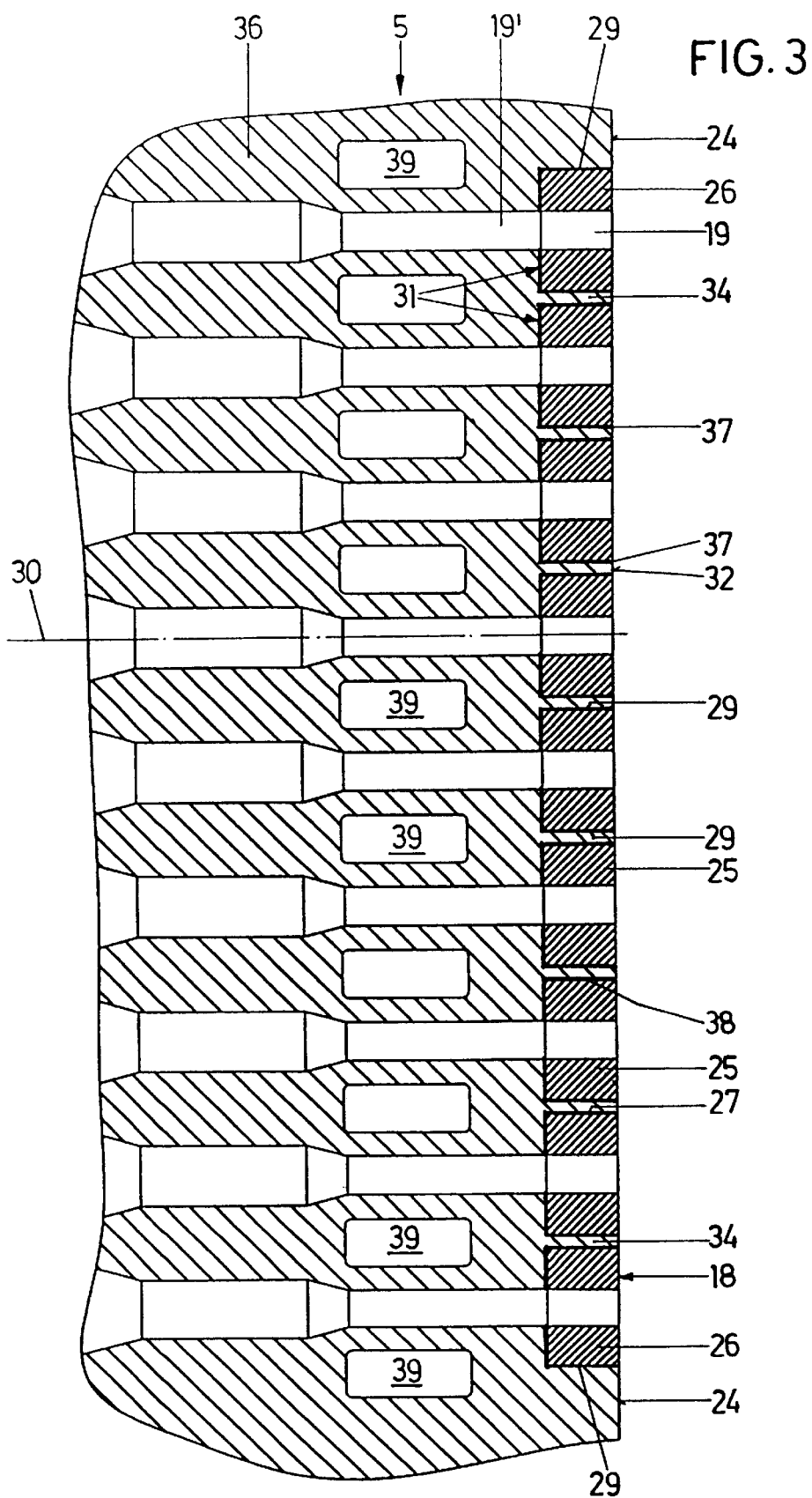

PELLETIZING DIE FOR A PELLETIZER

BACKGROUND OF THE INVENTION

1. Field of the Invention

The invention relates to a pelletizing die for a pelletizer, comprising a base body with a front; holes which are formed in the base body for melt to pass through and which are disposed in rows; wearing-protection inserts which have holes in alignment with the holes in the base body and discharging on the front, and which are disposed in adapted recesses in the base body and are fixed by solder, and which are in alignment with the front of the base body.

2. Background Art

In the case of pelletizing dies of the generic type, knives brush over the area of the holes, cutting into pellets the strands of plastic melt that discharge there-through. These cutting surfaces are exposed to considerable wear. Therefore, they are faced for instance with wearing protection inserts of tungsten or titanium carbide containing powder metal.

U.S. Pat. No. 3,271,822 teaches a pelletizing die of the generic type, in which the ring section of the pelletizing die where the holes discharge and which the knives wipe across is provided with adjoining wearing-protection inserts of the type of square wafers. With this design, the pelletizing die cutting surface formed by the ring section may be faced entirely with wearing-protection material. A drawback resides in that provision can only be made for a bottomside soldered joint towards the base body of the pelletizing die so that there is the risk of the wearing-protection inserts peeling off. Another difficulty resides in the assembly of the wearing-protection inserts because their holes and the holes in the base body must be made flush, which requires complicated centering jobs. By alternative, the inserts would have to be drilled or eroded once they have been applied by soldering.

Furthermore, pelletizing dies of the generic type are known, in which the wearing-protection inserts are cylindrical and inserted by soldering into corresponding cylindrical blind holes in alignment with the holes formed in the base body. In this case, centering takes place quasi automatically. The fact that the inserts are soldered on the base body all over their surface area precludes them from being peeled off by the rotary knives. The drawback resides in that only approximately 50 per cent of the cutting surface which the knives wipe across can be protected by wearing-protection inserts.

U.S. Pat. No. 3,461,495 A teaches to face greater segments of the cutting surface in the form of arcuate segments of a pelletizing die with wearing-protection plates. The advantage resides in that the cutting surface is entirely faced with wear-resistant material and that again peeling off is precluded. The disadvantage resides in that the holes must be drilled or eroded subsequently in the wearing-protection plate, which is only possible if titanium carbide containing powder metal is used. This only possesses a hardness of approximately 60 HRC as opposed to tungsten carbide containing powder metal of a hardness of 70 to 90 HRC, which means a reduction of lifetime.

SUMMARY OF THE INVENTION

It is an object of the invention to embody a pelletizing die of the generic type such that as high as possible a percentage of the cutting surfaces in the form of annular segments is faced with wearing-protection inserts and that this is accompanied with ease of assembly and sufficient protection against peeling off.

According to the invention, this object is attained by the features wherein the inserts which adjoin each other in a row, where facing an adjacent insert, each have a chordal surface which is disposed at a very close distance from the chordal surface of the adjacent insert; and wherein the inserts, laterally of the chordal surface, are provided with at least one surface of an arcuate segment of a cylinder. The measures according to the invention help obtain a closed wearing protection of the appearance of a caterpillar which reaches over a row of holes and is wider than the distance of the holes in the row. Their surfaces in the shape of an arcuate segment of a cylinder are joined to the base body by soldering all over the surface area, which helps obtain a very high solidity. Ease of assembly is ensured because the surfaces of an segment of a cylinder enable the holes which have been produced in the inserts prior to their being inserted in the recesses and the holes in the base body to be centered automatically.

Further features, advantages and details of the invention will become apparent from the ensuing description of an exemplary embodiment, taken in conjunction with the drawing.

BRIEF DESCRIPTION OF THE DRAWING

FIG. 3 is a partial cross-sectional view of the pelletizing die on the line III—III of FIG. 2.

DESCRIPTION OF THE PREFERRED EMBODIMENT

Figure 1:
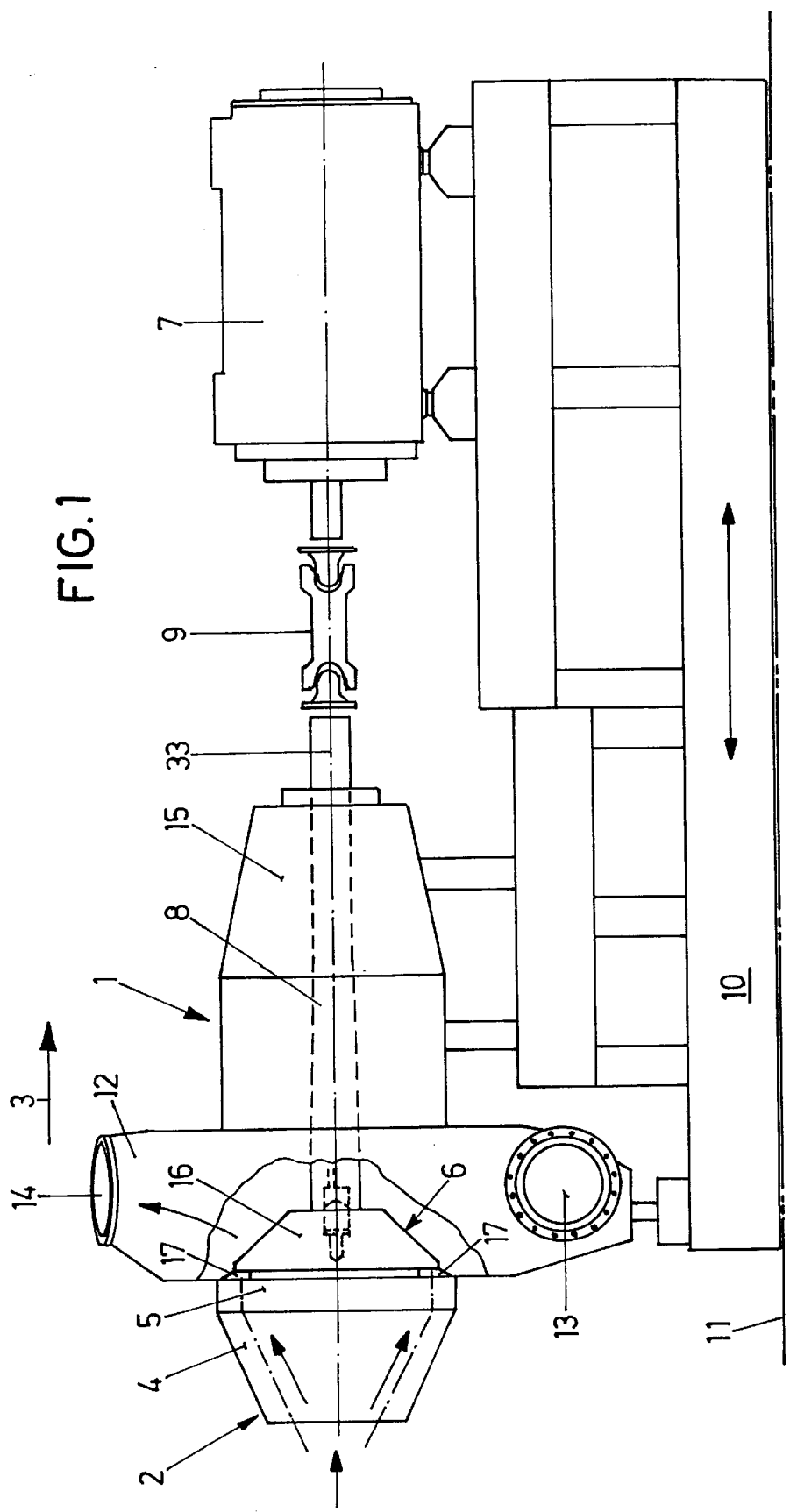
FIG. 1 is lateral longitudinal view of a pelletizer in an illustration partially broken open.

The pelletizing plant seen in FIG. 1 comprises a pelletizer 1, which is disposed in the direction of production 3 downstream of an extruder 2, of which only a pelletizing die head 4 with a stationary pelletizing die 5 are shown.

The pelletizer 1 comprises a knife head 6 driven by a drive 7 in the form of an electric motor via a shaft 8, in which a coupling 9 is inserted. The drive 7 and the pelletizer 1 are disposed on a carriage 10, which is movable on the foundation 11 for example in the form of rails from the position of operation seen in FIG. 1 in the direction of production 3 into a position in which it is spaced from the pelletizing die head 4.

The pelletizer 1 comprises a pelletizing hood 12, which encircles the knife head 6 and which is provided with a lower water inlet 13 and an upper water outlet 14. In the direction toward the drive 7, the pelletizing hood 12 is followed by a bearing housing 15, in which the shaft 8 is run as usual.

The knife head 6 comprises a knife carrier 16, which is called a blade impeller in practice because of its impeller type appearance and which is provided, on the front turned toward the pelletizing die head 4, with knives 17 which, during pelletization, wipe at a high speed across the front, turned toward them, of the pelletizing die 5, cutting the strands of plastic melt from the pelletizing die 5 into pellets which are conveyed to, and out of, the water outlet 14 by the water, which enters the pelletizing die 12 through the water inlet 13. As far as described hereinbefore, the pelletizing plant is known and general practice.

Figure 2:
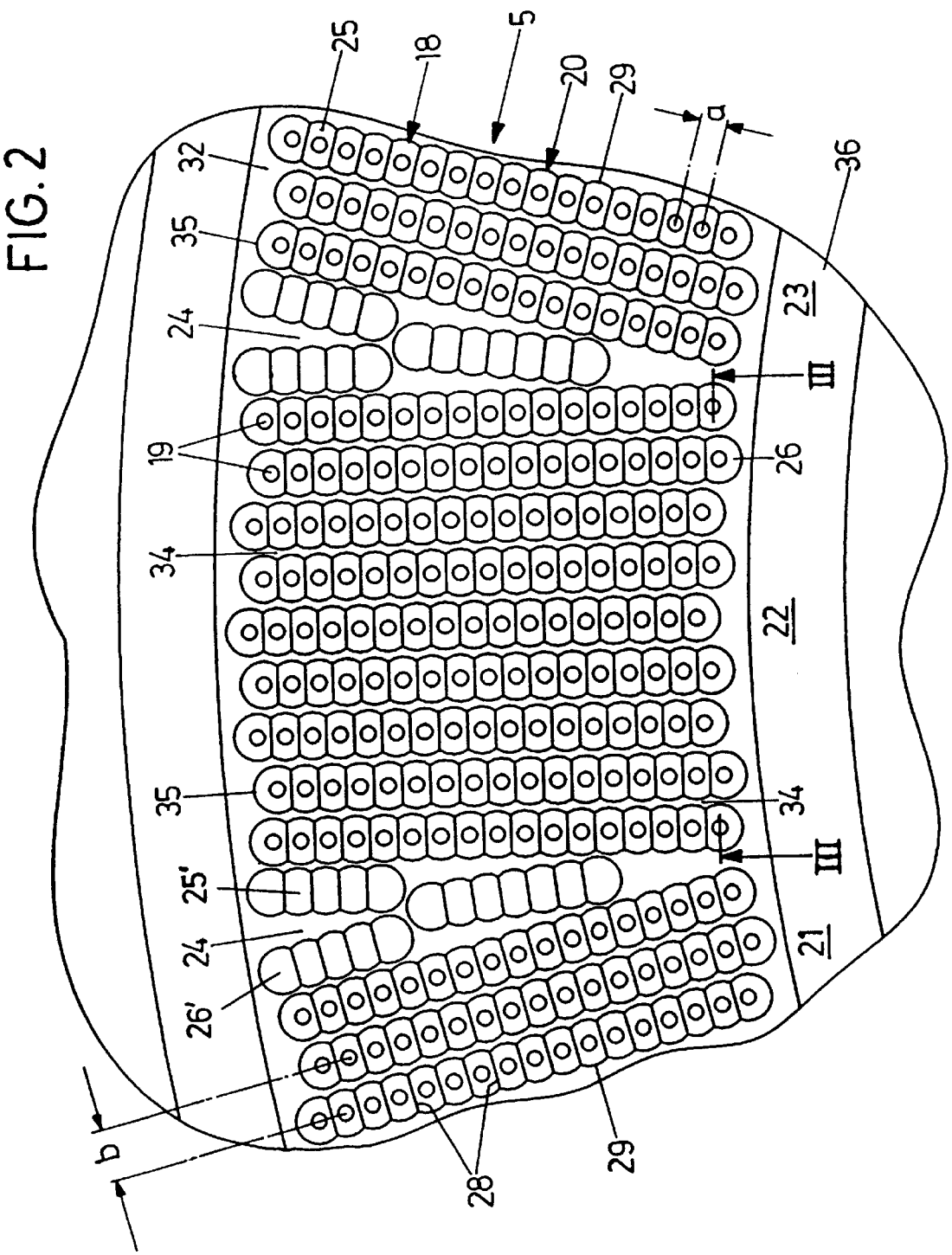
FIG. 2 is a partial plan view of a pelletizing die.

In its radially outer portion, the pelletizing die 5 comprises an annular cutting surface 18 from which discharge a plurality of holes 19; strands of plastic melt are delivered there-through, they are to be pelletized in the manner mentioned above and have a cross section corresponding to that of the holes 19. The knives 17 wipe across the cutting surface 18. It is therefore exposed to extreme wear. As seen in FIG. 2, the holes 19 are disposed in rows 20, the distance a of the holes 19 from each other in the rows 20 being very small. It is identical for all the rows 20. A higher number of rows 20 of the holes 19 is disposed in each of the blocks 21, 22, 23 with the rows 20 being approximately parallel. The blocks 21 and 23 are not completely illustrated in FIG. 2. Since the individual blocks 21, 22, 23 are disposed on the annular cutting surface 18, an acute triangular section 24 without holes forms between them.

The cutting surface 18 is protected against wear by the knives 17 that wipe across it substantially by wearing-protection inserts 25, 26. The peripheral surfaces 27 of the inserts 25 which are disposed within the rows 20 are defined by two parallel chordal surfaces 28 of an extension crosswise of a row 20 and by two opposed surfaces 29 in the shape of an arcuate segment of a cylinder. The central longitudinal axis of these surfaces 29 lies in the axis 30 of the holes 19 formed by cylindrical drilled holes. The inserts 25 are disposed in recesses 31 which are formed as blind holes in the base body 36, starting from the front 32 thereof, and which pass through each other partially in a plan view. Two inserts 25 which adjoin in a row 20 are directly adjacent to each other by their surfaces defined by the chordal surfaces 28, leaving only a minor gap (not shown in the drawing) for solder. Radially of the axis 33 of the shaft 8 and thus of the pelletizing die 5, the inserts 25 have a clearly lower extension than in the peripheral direction of the annular cutting surface 18. Their external surfaces are in alignment with the front 32 and define the cutting surface 18. As a result of the way of arrangement of the inserts 25, 26 in a row 20, this row 20 has the appearance of a caterpillar.

Adjoining rows 20 within a block 21, 22, 23 have such a distance b from each other that a continuous narrow rib 34 of the basic material of the pelletizing die 5 i.e., of the base body 36, remains between the opposed inserts 25. This rib 34 may be very narrow. The holes 19 of a row 20 and the holes 19 of an adjoining row 20 are staggered approximately radially of the axis 33 by half the distance a of two adjacent holes 19 of the same row 20 so that—as seen in FIG. 2—the respective rib 34 serpentines between two adjoining rows 20 while having approximately the same thickness throughout its length.

The inserts 26 located at both ends of each row 20 are provided with a flattened chordal surface 28 only on one side, namely on the side turned toward the adjoining inserts 25; otherwise they have a surface 35 of an arcuate segment of a cylinder that includes the two surfaces 29.

In the non-holed section 24, rows 20' of wearing-protection inserts 25', 26' are disposed, differing from the described inserts 25 and 26 only in that they have no holes 19. These rows 20' are disposed for substantially filling the non-holed section 24 in the shape of an acute triangle.

The wearing-protection inserts 25 and 26 are soldered by so-called surface-soldering of the cylindrical surfaces 29 and 35 in the shape of segments of a circle and the ribs 34 or the associated flanks of the sections 24 i.e., they are very firmly joined to the base body 36 of the pelletizing plate 5. The solder 37 is illustrated as a thin layer. In addition, there is also a bottomside soldered joint, the solder 38 equally being illustrated by a thin line.

FIG. 3 additionally shows that heating ducts 39 are formed in the base body 36 of the pelletizing die 5, which—seen from the front 32—run behind the ribs 34. Moreover, the holes 19' formed by drilled holes are visible; they are formed in the base body 36 and lead to the holes 19 in the inserts 25, 26.

What is claimed is:

1. A pelletizing die for a pellitizer, comprising
   a base body with a front and an axis;
   holes which are formed in the base body for melt to pass through and
   which are disposed in rows having a longitudinal direction;
   wearing-protection inserts
   said inserts having holes in alignment with the holes in the base body and discharging on the front, with adjacent holes in the rows having a distance a,
   said inserts are disposed in adapted recesses in the base body and are fixed by solder, and
   said inserts are in alignment with the front of the base body;
   wherein the inserts which adjoin each other in a row, where facing an adjacent insert, each have a chordal surface disposed directly adjacent to the chordal surface of the adjacent insert; and
   wherein the inserts, laterally of the chordal surface, are provided with at least one surface of an arcuate cylindrical segment.

2. A pelletizing die according to claim 1, wherein the rows are straight and substantially radial of axis.

3. A pelletizing die according to claim 1, wherein the inserts which are disposed within one of said rows have two parallel chordal surfaces and two opposed surfaces of an arcuate cylindrical segment.

4. A pelletizing die according to claim 1, wherein the inserts at both ends of one of said rows have a chordal surface and a surface of an arcuate cylindrical segment.

5. A pelletizing die according to claim 1, wherein several rows are combined, forming a block.

6. A pelletizing die according to claim 1, wherein the distance a of adjacent holes in a row is always identicial.

7. A pelletizing die according to claim 1, wherein adjoing rows are staggerd by half a distance a.

8. A pelletizing die according to claim 1, wherein a narrow rib of the base body is formed between the inserts of two adjoining rows.

9. A pelletizing die according to claim 5, wherein approximately triangular, non-holed sections are formed between adjoining blocks.

10. A pelletizing die according to claim 9, wherein non-holed wearing protection inserts are provided in the non-holed sections.

11. A pelletizing die according to claim 1, wherein the chordal surface extends approximately crosswise of the longitudinal direction of the row.

* * * * *